United States Patent [19]

Yamaguchi et al.

[11] Patent Number: 4,734,289

[45] Date of Patent: Mar. 29, 1988

[54] FOOD MATERIAL FOR PUFFING

[75] Inventors: Noriaki Yamaguchi, Jyouyou; Kiyoshi Shibuya, Nishinomiya; Takako Kubo, Nara, all of Japan

[73] Assignee: House Food Industrial Company Limited, Higashiosaka, Japan

[21] Appl. No.: 831,507

[22] Filed: Feb. 21, 1986

[30] Foreign Application Priority Data

Mar. 1, 1985 [JP] Japan ................................ 60-40676

[51] Int. Cl.$^4$ .................................................. A23L 1/18
[52] U.S. Cl. .................................... 426/302; 426/309; 426/621; 426/622; 426/625; 426/808; 426/450; 426/462; 426/242
[58] Field of Search ................................ 426/618-621, 426/622, 625, 242, 72, 74, 99, 289, 293, 445-446, 103, 296, 302, 303, 309, 449, 450, 808

[56] References Cited

U.S. PATENT DOCUMENTS

| | | | |
|---|---|---|---|
| 3,608,085 | 9/1971 | Papworth | 426/331 |
| 4,208,443 | 6/1980 | Kanuch et al. | 426/331 |
| 4,233,327 | 11/1980 | Ando et al. | 426/450 |
| 4,409,250 | 10/1983 | Van Halle et al. | 426/621 |

FOREIGN PATENT DOCUMENTS 0086261 5/1982 Japan ................................ 426/808

Primary Examiner—Raymond N. Jones
Assistant Examiner—Marianne M. Cintins
Attorney, Agent, or Firm—Oblon, Fisher, Spivak, McClelland & Maier

[57] ABSTRACT

This invention provides a food material for puffing, which enables easy and uniform puffing without a special appliance and which has good taste, smell and texture. The food material for puffing comprises pre-gelatinized cereal grain, 0.2 to 11% by weight of ethyl alcohol, 0.25 to 16% by weight of fat and/or oil and if desirable other additives, the water content of said food material being between 5 and 45 weight %. The food material is used as a breakfast food or snack as well as for making rice crackers.

1 Claim, No Drawings

FOOD MATERIAL FOR PUFFING

BACKGROUND OF THE INVENTION (1) Field of the Invention

The present invention relates to a food material for puffing, which can be easily puffed by heating, in particular by heating in a microwave oven, so that there can be obtained a puffed food such as a rice cracker.

(2) Description of the Prior Art

Puffed foods such as puffed rice crackers or puffed cereal grains are widely marketed. As a rule, it is necessary to use a special pressure-type appliance for puffing food, and, therefore, it is difficult to puff food at home. However, since selling food in a pre-puffed condition lowers the cost of transportation and puffing the food just before eating gives it better taste, smell and texture, much research has been conducted toward realizing a food material which enables easy puffing at home. For example, Japanese Patent Pre-examined Publication (KOKAI) No. 12264/1975 discloses a process for preparing a food material cooked by a microwave oven, which comprises kneading and rolling pre-gelatinized cereal grain; dehydrating the grain to a water content of between 13 and 28 weight %; and mixing the resulting solid material with 5 to 30% by weight of fat or oil. In this connection, the publication also discloses that the food material thus obtained easily produces a baked cracker by heating in a microwave oven. However, the food material thus obtained has faults in that the crackers formed of the food material adhere to each other when they are heated in a microwave oven, and the degree of puffing is not uniform.

Japanese Patent Pre-examined Publication (KOKAI) No. 136859/1976 further discloses a process for preparing food material for puffing, which comprises drying a rice cake (Japanese MOCHI) until the water content thereof is between 20 and 30 weight %; and adding water thereto before heating it in a microwave so as to increase the surface water content of the dried rice cake 5 to 15 weight % higher than the inner water content thereof. However, this method can neither prevent adherence of the rice cakes to each other nor accomplish uniform and high puffing of the cakes.

SUMMARY OF THE INVENTION

Under such circumstances, the present inventors made various studies and found that a food material which can be easily and uniformly puffed into a final puffed food which has good taste, smell and texture, which can be obtained by using pre-gelatinized cereal as a raw cereal grain, combining the pre-gelatinized cereal with a specific amount of ethyl alcohol and fat or oil, and adjusting the overall water content thereof to within a specific amount.

It is, therefore, a primary object of the present invention to provide a food material for puffing which enables easy and uniform puffing without a special appliance.

Another object of the present invention is to provide a food material for puffing which produces a puffed food having good taste, smell and texture, and which does not result in the pieces of the puffed food adhering to each other when they are heated for puffing.

Another object of the present invention is to provide a food material which enables easy puffing by use of a microwave oven.

These and other objects of this invention will be clear from the following description.

In accordance with the present invention, there is provided a food material for puffing, which comprises pre-gelatinized cereal grain, 0.2 to 11% by weight of ethyl alcohol and 0.25 to 16% by weight of fat and 1 or oil, the water content of said food material being between 5 and 45 weight %.

DESCRIPTION OF THE PREFERRED EMBODIMENTS

The pre-gelatinized cereal used in the present invention constitutes the matrix of the food material for puffing. Examples of the pre-gelatinized cereal include pre-gelatined material made from cereal kernels such as glutinous rice, nonglutinous rice and barley; cereal grain flour such as glutinous rice flour, nonglutinous rice flour, wheat flour, barley flour and corn flour; and starch such as corn starch and potato starch. Among these raw materials, for rice crackers, it is preferable to use a raw material such as a pre-gelatinized rice flour or pre-gelatinized starch, because use of such a material gives products good texture. The pre-gelatinizing treatment of the cereal can be conducted by known methods, for example by gelatinizing the starch contained in the cereal by boiling or steaming the cereal, but it is not necessary to gelatinize all the starch in the cereal. In this connection, non-pre-gelatinized starch, i.e., starch itself or cereal grain flour itself, may be used together with the pre-gelatinized cereal, preferably in an amount of not more than 40% by weight of the raw material. Salt, sugar, a seasoning agent and the like can be added to the cereal during pre-gelatinizing treatment.

The aforesaid pre-gelatinized cereal can be used in its natural form, for example, in kernel form, but can also be used in an appropriate shape obtained by molding according to a known method. For example, there can be used rice cakes (Japanese MOCHI) of an appropriate size (1 to 15 mm per side) which are produced according to the following process. Glutinous rice is immersed in water and pre-gelatinized by steaming, after which it is cut into appropriate size cakes. Alternatively, water is added to rice flour or starch, then kneaded, pre-gelatinized by steaming, molded into a large cake, left to stand until cooled, and thereafter is cut into appropriate size cakes. Furthermore, there can be used cakes molded to an appropriate size by a screw feeder. In this case, for example, a mixture of rice flour, starch and water is pre-gelatinized (pressed, steamed and mixed) in screw feeder and is then molded into the desired shape by the extruder. It is desirable to pre-gelatinize the cereal and mold it, as described above, using an extruder, because the drying treatment after molding can be omitted by adjusting the amount of water added, making it possible to reduce the number of steps for preparing the pre-gelatinized cereal. The pre-gelatinized cereal grain can be used in various shapes such as strips, cubes and spheres, but it is preferable to employ a cube- or sphere-like shape since the pieces of pre-gelatinized grain having such a shape adhere to each other less easily than when they have a flat shape. As for the size of the pieces of molded cereal, it is preferable to employ comparatively small ones measuring, for example, not more than 15 mm per side, so that uniform puffing can be obtained and the puffing degree becomes high, and as a result, a pre-gelatinized cereal having good texture can be obtained.

The above-described pre-gelatinized cereal used in the present invention preferably has a water content of 8.5 to 45 weight %, more preferably 10 to 28 weight %, so that the overall water content of the food material for puffing will fall within a specific desired range and also so that uniform puffing of the pre-gelatinized cereal will be assured. This is because the puffing degree of the pre-gelatinized cereal decreases and the resulting products become hard when there is used a pre-gelatinized cereal having a water content of less than 8.5 weight %. On the other hand, when there is used a pre-gelatinized cereal having a water content of more than 45 weight %, the pieces of pre-gelatinized cereal easily adhere to each other upon heating in a microwave oven and also suffer a decrease in the degree of puffing. In addition, it is also desirable to use the pre-gelatinized cereal in an amount accounting for 33.02 to 94.55 weight % of the food material for puffing.

In the present invention, it is necessary to use ethyl alcohol in order to increase the degree of puffing of the pre-gelatinized cereal, to prevent adhesion of the pre-gelatinized cereal kernels to each other and to prevent scorching, as well as to increase storability (prevention of molding and degradation of taste). In this case, either ethyl alcohol itself or an ethyl alcohol containing liquor such as Japanese rice wine (Japanese sake), brandy or wine can be used. The ethyl alcohol is preferable contained in the food material for puffing in an amount of 0.2 to 11 weight %, more preferably 0.35 to 10.3 weight %, as ethyl alcohol. The effect of preventing adhesion of the pre-gelatinized cereal kernels and of preventing scorching is small and degree of puffing of the pre-gelatinized cereal is insufficient when the ethyl alcohol content is less than 0.2 weight %, whereas it is not preferable to include more than 11% by weight of ethyl alcohol because smell of alcohol is produced during heating and puffing and, at the same time, the degree of puffing decreases. It is also preferable to use a pre-gelatinized cereal having a low water content when an alcohol containing liquor is used in the present invention because water contained in the liquor is absorbed by the pre-gelatinized cereal.

Examples of fat or oil usable in this invention include vegetable oils such as palm oil, rice oil, soybean oil, corn oil and salad oil; processed oil such as shortening, butter and powdered fat; and animal fats such as lard and tallow. Among these fats and oils, it is preferable to use a fat or oil having a melting point near room temperature (from 10° to 25° C.) because this gives a good appearance to the product and makes it easily to charge the product in the packaging container for heating and also makes it easy to take the product out of the container. Fat or oil are used in this invention in order to prevent adhesion of the pre-gelatinized cereal kernels to each other during puffing by heating as well as in storage. It is also used to increase the degree of puffing and to prevent scorching. Fat or oil is therefore added to the food material for puffing at 0.25 to 16 weight %, preferably 0.28 to 15.43 weight %. This is because the above effects cannot be obtained when the amount of fat and oil is less than 0.25 weight %. On the other hand, when the amount of fat and/or oil is more than 16 weight %, the pre-gelatinized cereal may absorb so much fat and/or oil that the taste thereof becomes oily and the degree of puffing is decreased.

In the food material for puffing of this invention, there can be added, beside the above-described components, many kinds of other components such as emulsifying agents, many kinds of vitamins, animal and vegetable extracts, amino acids, minerals, perfumes, dyestuff etc., according to the desired taste and the product shape. Among these additives, it is preferable to add emulsifying agents, in particular sugar ester having an HLB of not less than 9, in an amount of 0.4 to 2 weight % relative to the total amount of food material for puffing since adhesion of the molded pre-gelatinized cereal kernels to each other can be prevented and the degree of puffing can also be increased by an interaction of the emulsifying agents and the fat and oil.

The food material for puffing of this invention can be prepared according to any method, but it is preferably prepared according to a method which comprises molding pre-gelatinized cereal kernels or pre-gelatinized cereal to suitable size, pregnating ethyl alcohol into the resulting food material and then coating the surface thereof with fat and oil.

In addition, the water content of the food material for puffing of this invention is adjusted to 5 to 45 weight %, preferably 6.7 to 42 weight %. This process is employed to assure easy puffing and to prevent adhesion of the pre-gelatinized cereal kernels to each other. Accordingly, as described above, it is preferable to use a pre-gelatinized cereal having a water content 13 to 45 weight % and to adjust the water content to the above amount, considering the water content of other additives.

The food material for puffing of this invention can, for example, be sold as packed in a container also containing other related food maerials or as packed by itself with a seasoning agent used therewith being packed in a separate container. It is preferable sold as packed in a container made from a heat resistant material so that it can be puffed by heating in a microwave oven after the lid has been removed. It is also possible to puff the food material with known heat treatments not using a microwave oven.

The present invention will now be illustrated more concretely by referring to the following non-limitative examples together with comparative examples.

EXAMPLE 1

50 parts by weight of rice cake (Japanese MOCHI; water content of 43 weight %) prepared by a conventional method (glutinous rice→washing→immersion in water→removing water therefrom→steaming and kneadling→molding) were cut into 2×8×8 mm squares by a cutter, and the squares were dried in a stream of 75° C. air until their water content had fallen to 22.9 weight %. 1.5 part by weight of ethyl alcohol was then added to the resulting rice cake to pregnant it therein, after which 2.5 parts by weight of palm oil, 1 part by weight of salt, 1 part by weight of soy sauce and 1 part by weight of sugar were added thereto and mixed with each other. The resulting product was packed in a polyethylene bag and sealed, and therefore a product (water content: 20.7 weight %) of the present invention was obtained.

In the next stage, the product was taken out from the bag and was placed in a heat resistant container, after which it was heated in a microwave oven (500 W: 90 seconds). As a result, there was obtained salty puffed crackers (sample C) which did not adhere to each other at all, crackers had good texture.

According to the same process as described above, puffed crackers were prepared by varying the water content of the rice cake and the amounts of ethyl alcohol, fat and oil. As a result, sample product Nos. A, B and D–K were obtained. The processing conditions and characteristics of the products are summarized in Table 1. In this table, the degree of puffing is shown as the value obtained by dividing the volume of crackers puffed by heating in a microwave oven by the volume of the raw material for the puffed crackers.

EXAMPLE 4

82% of corn flour, 2% of a seasoning agent and 16% of potato starch were employed, as raw materials. In the first stage water and a seasoning agent were added to the corn flour and the mixture then was subjected to steaming and kneading under pressure. Thereafter potato starch was added thereto and the resulting dough was molded into 18×12×2 mm pieces. In the second stage, pre-gelatinized cereal (water content: 9%) was obtained by drying the pieces with hot air. 2.5 parts by weight of ethyl alcohol were added to 50 parts by weight of the pre-gelatinized cereal and pregnated therein. 2.5 parts by weight of palm oil were then added thereto and mixed in. As a result, a food material (water content: 8.2%) for puffing was obtained.

The resulting food material was heated by the same method as described in Example 3 and there was obtained a good food the pieces of which did not adhere to each other, were not scorched and were puffed to about 5.6 times to their original volume. The food was found to have a good taste and texture when it was eaten.

As described above, according to the present invention there can be obtained a food material for puffing, which enables easy and uniform puffing without a special appliance and which has good taste, smell and texture. In addition, there can be provided a food comprised of pieces of molded pre-gelatinized cereal which do not adhere to each other, which do not easily scorch when puffed by heating and which exhibit long-term storability. Accordingly, puffed food having a good taste can be obtained by only heating for 1 to 2 minutes in a microwave oven. At the same time, there can be enjoyed the taste of a home-made food.

Since the food material for puffing of the present invention has the characteristics described above, the food material is ideal as a breakfast food or snack, and can be widely used for making rice crackers such as Japanese Okaki. Furthermore, the food material is useful as an instant food (a light quickly prepared food) packed in a packaging container on the assumption that it will be puffed by heating in a microwave oven.

What is claimed is:

TABLE - 1

| | Conditions | | | | Characteristics | | | |
|---|---|---|---|---|---|---|---|---|
| Sample Nos. | Water content of food material for puffing (%) | Water content of rice cake (%) | Amount of fat and oil (parts by weight) | Amount of ethyl alcohol (parts by weight) | Degree of puffing (times) | Degree of adhesion | Scorching and color | Texture |
| A* | 4.0 | 4.4 | 2.5 | 1.5 | 1.2 | no adhesion | much scorching | hard |
| B | 11.2 | 12.6 | " | " | 3 | " | slight scorching | slightly hard |
| C | 20.7 | 22.9 | " | " | 9 | " | uniform color | crispy |
| D | 29.3 | 31.9 | " | " | 6 | " | " | " |
| E* | 46.8 | 49.9 | " | " | 1.5 | much adhesion | " | bad texture |
| F* | 22.6 | 23.5 | 0 | | 5 | " | much scorching, not uniform color | slightly hard |
| G | 21.3 | 23.5 | 2.5 | " | 8 | no adhesion | uniform color | crispy |
| H* | 18.1 | 23.5 | 10.0 | " | 5.3 | slight adhesion | " | slightly hard |
| I* | 10.3 | 21.6 | 2.5 | 0 | 6.9 | much adhesion | much scorching | " |
| J | 19.6 | 21.6 | " | 1.5 | 10 | no adhesion | uniform color | crispy |
| K* | 17.5 | 21.6 | " | 6.5 | 5.7 | slight adhesion | " | slightly hard |

*Comparative example

EXAMPLE 2

Rice cakes were dried by the same method as described in Example 1 except that rice cakes having the shape of 4 mm cubes were employed. 1.5 part by weight of ethyl alcohol was then added thereto and pregnated therein, after which 2.5 parts by weight of palm oil, 2.2 parts by weight of white sugar and 0.5 part by weight of salt were added thereto and mixed with each other. As a result, a food material (water content 17.5%) for puffing of this invention was obtained.

A sweet type—rice cracker having good texture was obtained by puffing the above food material according to the same method as described in Example 1.

EXAMPLE 3

78% of wheat flour, 18.5% of potato starch and 3.5% of a seasoning agent were used as raw materials. Water was added to these materials and then subjected to steaming, kneading, rolling and drying in air, after which the resulting material was cut into 30×11×1 mm pieces. The cut material was dried again at a temperature of 80° C. in hot air, whereby it was pre-gelatinized (water content 12.5%). 2 parts by weight of ethyl alcohol were added to 50 parts by weight of the pre-gelatinized cereal and pregnated therein. 2 parts of palm oil were then added and mixed therewith. As a result, a food material (water content: 11.5%) for puffing of this invention was obtained.

The resulting food material was heated for 100 seconds in a microwave oven (500 W) and there was obtained good product the pieces of which did not adhere to each other, were not scorched and were puffed to about 9.3 times to their original volume. The food was found to have a good taste and texture when it was eaten.

1. A process for preparing a food material for puffing containing 33.02 to 94.55% by weight of pre-gelatinized material selected from the group consisting of cereal grains, flours and starches; 0.2 to 11% by weight of ethyl alcohol and 0.25 to 16% by weight of edible fat, oil or mixtures thereof, the water content of said food material ranging between 5 and 45% by weight, which comprises the steps of:
    impregnating said pre-gelatinized material having a predetermined water content with said ethyl alcohol; and
    coating the material obtained with said edible fat, oil or mixture thereof, whereby pieces of said product do not adhere to each other upon puffing.

* * * * *